United States Patent Office.

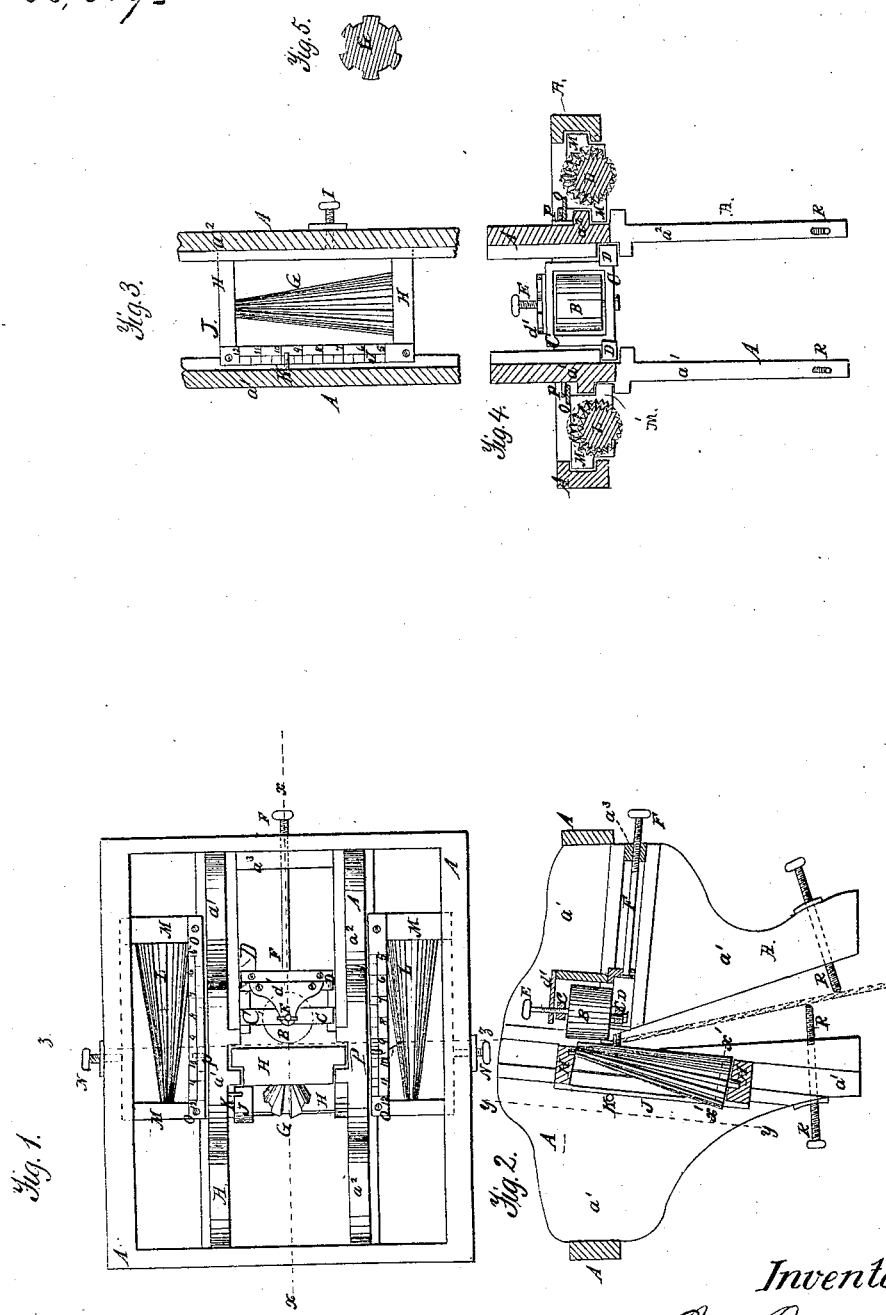

IMPROVED SAW SET.

JOHN CLARRIDGE, OF PANCOASTBURG, OHIO.

Letters Patent No. 60,619, dated December 18, 1866.

---

The Schedule referred to in these Letters Patent and making part of the same.

---

TO ALL WHOM IT MAY CONCERN:

Be it known that I, JOHN CLARRIDGE, of Pancoastburg, in the county of Fayette, and State of Ohio, have invented a new and useful Improvement in Saw Sets; and I do hereby declare that the following is a full, clear, and exact description thereof, which will enable others skilled in the art to make and use the same, reference being had to the accompanying drawings, forming part of this specification, in which—

Figure 1 is a top view of my improved saw set.

Figure 2 is a vertical section of the same, taken through the line $x\ x$, fig. 1.

Figure 3 is a detail sectional view of the same, taken through the line $y\ y$, fig. 2.

Figure 4 is a vertical section of the same, taken through the line $z\ z$, fig. 1.

Figure 5 is a detail sectional view, taken through the line $x'\ x'$, fig. 2.

Similar letters of reference indicate like parts.

My invention has for its object to furnish an improved saw set, so constructed and arranged as to set a saw quickly and accurately, and which may be adjusted to set the teeth of fine or coarse saws with equal facility and accuracy, and to set them much or little, as may be desired. And it consists of the combination of the cylinder, cones, sliding frames, scales, index pins, and set-screws with each other and with the frame of the machine.

A is the frame of the machine; B the cylinder against which the teeth are set. This cylinder is pivoted in the small sliding frame, C, which slides up and down in grooves in the horizontal sliding frame, D, as shown in figs. 1 and 4. E is a set-screw, the lower part of which forms the shaft upon which the said cylinder B revolves. Upon the upper part of the screw E is cut a screw-thread, which fits into a screw-thread cut in a hole in the plate, $d'$, which is attached to and forms a part of the frame D. By this arrangement the cylinder B can be moved up or down to bring it into the proper position to give the required set to the teeth. The frame D slides back and forth in grooves formed in the parts, $a^1$ and $a^2$, of the frame A, as shown in figs. 2 and 4, as it is moved by the set-screw, F, which works in a nut attached to the cross-bar, $a^3$, of the frame A, and the end of which is pivoted to the frame D, as shown in figs. 1 and 2. G is the cone, by means of which the proper set is given to the teeth. This cone is pivoted to a frame, H, which slides up and down in vertical grooves formed in the parts $a^1$ and $a^2$ of the frame A, as shown in figs. 1, 2, and 3, and which is secured at any desired elevation by the set-screw, I, that passes in through the part $a^2$ of the frame A. The cone G is furrowed longitudinally with grooves having square shoulders, and which taper with the taper of the cone, leaving a tapering projection between each pair of grooves. In setting a saw these projections come in contact with every alternate tooth of the saw, and set it by forcing it up against the cylinder B. To enable this to be done, the space of an inch of the circumference of the cone G, measured around that part of the said cone that comes in contact with the saw teeth, must contain as many grooves and projections, counted together, as there are teeth to an inch in the saw blade. For convenience in setting the cone G in such a position, there is attached to the frame H a scale, J, divided off and numbered, so as to show how many grooves and projections there are to an inch at each point of the cone; and to the part $a^1$ of the frame A there is atached an index pin, K, so that by moving the frame H up or down until the index pin shall point to any desired division point of the scale J, as, for instance, to the point 10, the cone will be in the proper position to set a saw the teeth of which are ten to an inch. To insure the saw teeth being always in the same relative position with reference to the cone G and cylinder B, the cones, L, are used. These cones L are pivoted in the frames, M, which slide in horizontal grooves in the frame A, as shown in figs. 1 and 4, and are held in any desired position by the set-screws, N. The cones L are grooved longitudinally with angular grooves, into which the teeth of the saw enter as the saw set is moved along the edge of the saw, so as to keep the saw set always in the same relative position with reference to the saw teeth. The frame M and cones L are provided with scales, O, and index pins, P, constructed and arranged in the manner already described with reference to the scale J and index pin K of the frame H and cone G. R are set-screws passing through the lower ends of the parts $a^1$ and $a^2$ of the frame A, on each side of the notch which the saw blade enters. By means of these screws R the saw blade is made to enter the said notch in such a position that the cone G and cylinder B may give much or little set to the saw teeth, as may be desired. In using the machine, the cones G and L are adjusted by means of the scales and index pins, according to the coarseness or fineness of the saw teeth, and the set-screws R arranged so that the teeth may be set much or little, as desired.

The saw set is then placed in proper position upon the saw blade, (shown in red in fig. 2,) and the cylinder B adjusted to the proper height by the set-screw E, and moved up closely against the teeth by the set-screw F. Then by passing the saw set along the blade of the saw from end to end, the alternate teeth will be set exactly alike. By reversing the saw set and passing it along the saw in the opposite direction, the other teeth will be set and the operation completed.

I claim as new, and desire to secure by Letters Patent—

An improved saw set, formed by the combination of the cylinder B, cones G and L, scales J and O, index pins K and P, set-screws E, F, I, N, and R, with each other, and with the frame A, substantially as herein described and for the purposes set forth.

The above specification of my invention signed by me this 25th day of June, 1866.

JOHN CLARRIDGE.

Witnesses:
    WM. F. McNAMARA,
    JAMES T. GRAHAM.